United States Patent
Iroaga et al.

(10) Patent No.: US 6,587,296 B1
(45) Date of Patent: Jul. 1, 2003

(54) CAPACITOR BIAS RECOVERY METHODOLOGY

(75) Inventors: Echere Iroaga, Garland, TX (US); Ashish Manjrekar, Dallas, TX (US); Bryan E. Bloodworth, Irving, TX (US)

(73) Assignee: Texas Instruments Incorporated, Dallas, TX (US)

( * ) Notice: Subject to any disclaimer, the term of this patent is extended or adjusted under 35 U.S.C. 154(b) by 417 days.

(21) Appl. No.: 09/621,200

(22) Filed: Jul. 21, 2000

(51) Int. Cl.$^7$ ................................................ G11B 15/12
(52) U.S. Cl. ........................... 360/63; 360/66; 360/67; 360/46
(58) Field of Search .............................. 360/66, 67, 46, 360/61, 63, 55; 330/252, 259, 261, 285, 127

(56) References Cited

U.S. PATENT DOCUMENTS

| | | | |
|---|---|---|---|
| 5,726,821 A | * | 3/1998 | Cloke et al. ............... 360/67 |
| 5,917,670 A | | 6/1999 | Scaramuzzo et al. |
| 5,982,569 A | | 11/1999 | Lin et al. |
| 5,995,311 A | | 11/1999 | Kuwano |
| 6,061,192 A | | 5/2000 | Ogiwara |
| 6,307,699 B1 | * | 10/2001 | Patti et al. ................. 360/66 |

OTHER PUBLICATIONS

"A Design for High Noise Rejection in a Pseudodifferential Preamplifier for Hard Disk Drives", IEEE Journal of Solid–State Circuits, Vo. 35, No. 6, Jun., 2000, 2 pp.

"Fast Offset Recovery for Thermal Asperity Data Recovery Procedure", IBM Technical Disclosure Bulletin, Apr., 1992, Publication No. 11, Reprinted from the Internet at: http://www.patents.ibm.com/tdbs/tdb?o=92A%2061003, 2 pp.

* cited by examiner

*Primary Examiner*—Alan T. Faber
(74) *Attorney, Agent, or Firm*—W. Daniel Swayze, Jr.; W. James Brady; Frederick J. Telecky, Jr.

(57) ABSTRACT

A preamplifier circuit for a hard disk drive system comprises a preamplifier circuit having a bias voltage circuit stage associated therewith. The preamplifier circuit further comprises a current bias boost recovery circuit operatively coupled to the bias voltage circuit stage which is configured to increase a rate of charging of a noise reduction capacitor associated with the bias voltage circuit stage. A head select boost recovery circuit is also operatively coupled to the bias voltage circuit and is configured to increase a rate of charging or discharging of a bias capacitor associated with the bias voltage circuit stage. Together the circuits allow for a concurrent head switch and current bias switch and avoids the problems associated with the prior art.

14 Claims, 3 Drawing Sheets

CAPACITOR BIAS RECOVERY METHODOLOGY

FIELD OF THE INVENTION

The present invention relates to disk drive circuits and, more particularly, to an apparatus, system and method for biasing a hard disk drive circuit.

BACKGROUND OF THE INVENTION

Hard disk drives such as the exemplary drive 10 illustrated in FIG. 1 include a stack of magnetically coated platters 12 that are used for storing information. The magnetically coated platters 12 are mounted together in a stacked position through a spindle 14 which may be referred to as a platter stack. The platter stack is typically rotated by a motor that is referred to as a spindle motor or a servo motor (not shown). A space is provided between each platter to allow an arm 18 having a read/write head or slider 20 associated therewith to be positioned on each side of each platter 12 so that information may be stored and retrieved. Information is stored on each side of each platter 12 and is generally organized into sectors, tracks, zones, and cylinders.

Each of the read/write heads or sliders 20 are mounted to one end of the dedicated suspension arm 18 so that each of the read/write heads may be positioned as desired. The opposite end of each of the suspension arms 18 are coupled together at a voice coil motor 16 (VCM) to form one unit or assembly that is positionable by the voice coil motor. Each of the suspension arms 18 are provided in a fixed position relative to each other. The voice coil motor 16 positions all the suspension arms 18 so that the active read/write head 20 is properly positioned for reading or writing information. The read/write heads or sliders 20 may move from at least an inner diameter to an outer diameter of each platter 12 where data is stored. This distance may be referred to as a data stroke.

Hard disk drives also include a variety of electronic circuitry for processing data and for controlling its overall operation. This electronic circuitry may include a pre-amplifier, a read channel, a write channel, a servo controller, a motor control circuit, a read-only memory (ROM), a random-access memory (RAM), and a variety of disk control circuitry (not shown) to control the operation of the hard disk drive and to properly interface the hard disk drive to a system bus. The pre-amplifier may contain a read pre-amplifier and a write pre-amplifier that is also referred to as a write driver. The pre-amplifier may be implemented in a single integrated circuit or in separate integrated circuits such as a read pre-amplifier and a write pre-amplifier or write driver. The disk control circuitry generally includes a separate microprocessor for executing instructions stored in memory to control the operation and interface of the hard disk drive.

Hard disk drives perform write, read, and servo operations when storing and retrieving data. Generally, a write operation includes receiving data from a system bus and storing the data in the RAM. The microprocessor schedules a series of events to allow the information to be transferred from the RAM to the platters 12 through the write channel. Before the information is transferred, the read/write heads 20 are positioned on the appropriate track and the appropriate sector of the track is located. The data from the RAM is then communicated to the write channel as a digital write signal. The write channel processes the digital write signal and generates an analog write signal. In doing this, the write channel may encode the data so that the data can be more reliably retrieved later. The digital write signal may then be provided to an appropriate read/write head 20 after first being amplified by the pre-amplifier. Writing data to the recording medium or platter 12 is typically performed by applying a current to a coil of the head 20 so that a magnetic field is induced in an adjacent magnetically permeable core, with the core transmitting a magnetic signal across a spacing of the disk to magnetize a small pattern or digital bit of the media associated with the disk.

In a read operation, the appropriate sector to be read is located and data that has been previously written to the platters 12 is read. The appropriate read/write head 20 senses the changes in the magnetic flux and generates a corresponding analog read signal. The analog read signal is provided back to the electronic circuitry where a preamplifier circuit 32 amplifies the analog read signal. The amplified analog read signal is then provided to a read channel circuit 34 where the read channel conditions the signal and detects "zeros" and "ones" from the signal to generate a digital read signal. The read channel may condition the signal by amplifying the signal to an appropriate level using, for example, automatic gain control (AGC) techniques. The read channel may then filter the signal to eliminate unwanted high frequency noise, equalize the channel, perform the data recovery from the signal, and format the digital read signal. The digital read signal is then transferred from the read channel and is stored in the RAM (not shown). The microprocessor may then communicate to the host that data is ready to be transferred.

As seen in FIG. 1, many disk drive systems 10 utilize multiple heads 20 due to the multiple platters and use of both sides of the platter. When reading from a particular platter, the head associated therewith is biased at an optimal voltage via a bias current (wherein the unique head itself is the resistive load (RMR)). Therefore in order to bias each head in an optimal manner for read operations, the preamplifier circuit must supply the appropriate bias current to the respective head. Since each head does not exhibit the same resistance (e.g., 30Ω, 45Ω, etc.), the bias current provided by the preamplifier circuit must change depending on which head has been selected.

Therefore when a portion of data is segmented onto different platters and the data portion is being read, a head switch according to the prior art requires two write steps to a serial port register associated with the preamplifier circuit, wherein one step involves sending a serial, multi-bit code thereto indicating what head is the next or selected head, and another step involves writing a serial, multi-bit code to the serial port register indicating the appropriate bias current to employ for the desired head. Thus a head switch in the prior art required that two write steps to the serial port register be performed in a serial manner. Such sequencing negatively impacts the rate at which data can be read from the disk.

The reason that a prior art head switch requires two successive write steps to the serial port register may be further appreciated with respect to FIG. 2 which illustrates an exemplary bias voltage circuit stage portion 50 of a preamplifier circuit. Bias voltage circuit 50 includes a bipolar transistor Q1 which drives the head which is represented by a resistive load $R_{MR}$ (the value of which will vary from head to head from about 25Ω to about 65Ω). A $g_m$ amplifier operates to compare the voltages at nodes A and B produce an output signal associated therewith which drives an output node BIAS to charge or discharge capacitor C1. The charge on capacitor C1 sets a bias voltage at the node BIAS which biases the transistor Q1, thereby setting the bias current through the head ($R_{MR}$). The bias current through $R_{MR}$ influences the voltage at node B which is compared to a reference node A. Thus the influence of node B provides feedback via the $g_m$ amplifier and bias capacitor C1 to adjust the bias current appropriately based on the reference voltage at node A. In addition, in order to improve a signal-to-noise ratio (S/N) the bias voltage circuit 50 includes a noise reduction capacitor C2 which, although improving the S/N, slows the bias response of the circuit 50 by retarding the voltage response at node A, the negative impact of which will be discussed below.

When a head switch is to occur, a head select signal opens a switch S1 which decouples the previously selected head and a second switch S2 is closed by a dummy head select signal, thereby activating a dummy transistor Q2 to drive the dummy head ($R_{DUMMY}$). $R_{DUMMY}$ is typically a resistance having a value of about 10–20% of the lowest expected head resistance. The low value dummy resistance ensures that the node voltage BIAS across C1 gets discharged to a value that will be lower than what is needed for the next head (the selected head). Consequently, when a new head is selected, the transistor (such as Q1) associated with the next selected head will not drive its associated head ($R_{MR}$) too hard, which would otherwise cause a glitch to damage the respective head. Therefore prior to switching to a new head, a dummy head switch occurs and a sufficient amount of time must pass to ensure that C1 adequately discharges to a safe level.

Subsequently, a current source I1 related to the desired bias current is coupled to node A which drives node A associated with the noise suppression capacitor C2 to a proper reference voltage associated with the desired bias current. However, because C2 does not charge instantaneously, node A "recovers" slowly. Because such a slow recovery of node A would result in the node BIAS across C1 charging (thus potentially causing damage to the next selected head), the recovery of node A via capacitor C2 cannot occur concurrently with the C1 recovery discussed above. Consequently, C2 recovery in prior art systems occurs after C1 recovery, thereby disadvantageously causing increased delay.

Therefore the prior art methodology for switching from one head to another may be illustrated in FIG. 3 and designated at reference numeral 80. The prior art method of switching heads required two separate, serially performed steps: (1) a head switch 82, and (2) a current bias switch 84. In particular, the head switch 82 included a step of writing a multi-bit code to a serial port register to indicate the next desired head (step 86), a switch to the dummy head (step 88) to initiate a discharge of C1, and a wait period (step 90) to allow C1 to sufficiently discharge to a safe level to avoid a glitch at the next head when connecting thereto. Once the wait period was complete and the next head had been selected, a second write to the serial port register was made to indicate the desired bias current for the next selected head (step 92). Subsequently, another wait period was initiated to allow C2 to recover to a predetermined level at step 94.

There is a need in the art for speed improvement in switching from one head to another in a hard disk drive mass storage device.

SUMMARY OF THE INVENTION

The present invention relates to a system and method of switching heads in a hard disk drive mass storage system which overcomes the disadvantages associated with the prior art. In particular, the present invention relates to a system and method of switching heads in which the head switch and current bias switch associated therewith are performed concurrently with one another, thereby allowing such steps to be achieved in a single write step to the serial port register, and improving a rate at which the head switch is accomplished.

In accordance with one aspect of the present invention, a preamplifier circuit is disclosed having a bias voltage circuit stage associated therewith. The preamplifier circuit further comprises a current bias boost recovery circuit and a head select boost recovery circuit both of which are operatively coupled to the bias voltage circuit stage. The current bias boost recovery circuit is configured to increase a rate of charging of a noise reduction capacitor associated with the bias voltage circuit stage. In addition, the head select boost recovery circuit is configured to selectively increase a rate of charging or discharging of a bias capacitor associated with the bias voltage circuit stage. Together the current bias boost recovery circuit and the head select boost recovery circuit are operable to facilitate a concurrent head switch and current bias switch.

According to another aspect of the present invention, the current bias boost recovery circuit comprises a voltage level detection circuit and a target voltage application circuit operatively coupled together. The voltage level detection circuit is configured to determine a target voltage associated with the noise reduction capacitor, for example, a reference node voltage having a value associated with the desired bias current for a given head. The target voltage application circuit is configured to selectively apply the target voltage determined by the voltage level detection circuit to the node of the noise reduction capacitor, thereby increasing substantially a rate at which the noise reduction capacitor charges to the target voltage. Consequently, the recovery associated with the noise reduction capacitor occurs extremely quickly, and brings the reference node associated therewith to its desired reference value in a timely manner.

According to still another aspect of the present invention, the voltage level detection circuit comprises a current mirror circuit and a voltage generation circuit operatively coupled to the current mirror circuit. The current mirror circuit is configured to generate a current having a magnitude which is related to the desired target voltage and the voltage generation circuit is configured to generate a voltage level approximating the target voltage using the generated current. Once generated, the target value application circuit is operable to selectively couple the generated target voltage to the reference node for a quick recovery across the noise reduction capacitor, thereby improving recovery associated therewith.

According to yet another aspect of the present invention, the head select boost recovery circuit comprises a differential voltage detection circuit and a selectively activatable drive circuit associated therewith. The differential voltage detection circuit is configured to monitor a difference between a reference node and another node associated with the head bias current, and is further configured to activate the drive circuit if a difference between the nodes exceeds a predetermined threshold. The drive circuit is configured to drive, when activated, a bias capacitor associated therewith to increase a rate of charging or discharging associated therewith, thereby minimizing the difference between the nodes in a timely manner. In accordance with an exemplary aspect of the present invention, the differential voltage detection circuit and the selectively activatable drive circuit comprise a differential amplifier having an offset trigger voltage associated therewith, wherein the offset trigger voltage is related to the predetermined threshold.

To the accomplishment of the foregoing and related ends, the invention, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed and the present invention is intended to include all such embodiments and their equivalents. Other objects, advantages and novel features of the invention will become apparent from the following detailed description of the invention when considered in conjunction with the drawings.

DETAILED DESCRIPTION OF THE INVENTION

The present invention will now be described with respect to the accompanying drawings in which like numbered elements represent like parts.

The present invention relates to a system and method of performing a head switch and a current bias switch in a disk drive system in a timely and efficient manner. The system and method include a circuit architecture and timing sequence that facilitates a concurrent head switch and current bias in a single write to a serial port register.

The architecture and timing sequence includes a current bias boost recovery circuit and a head select boost recovery circuit associated with the preamplifier circuit which are selectively activated via the timing sequence to achieve the above advantageous functionality. For example, the current bias recovery circuit is configured to increase a rate at which a reference node associated with a noise reduction capacitor is charged to a target value. In addition, the head select boost recovery circuit is configured to selectively increase a rate at which a bias capacitor is charged or discharged based on a comparison of the reference node and another node having a value which is a function of the bias current. The activation of the above circuits allow for the concurrent switching of the head and the current bias, thereby improving the timing associated with a head switch in a disk drive system.

Figure 1:
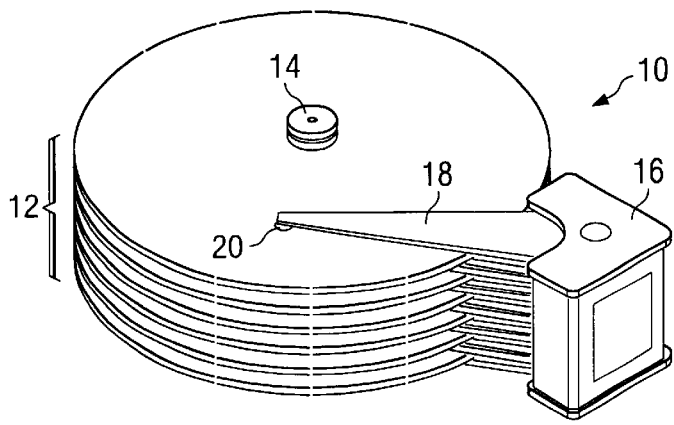
FIG. 1 is a perspective view illustrating a hard disk drive mass storage system.
Figure 2:
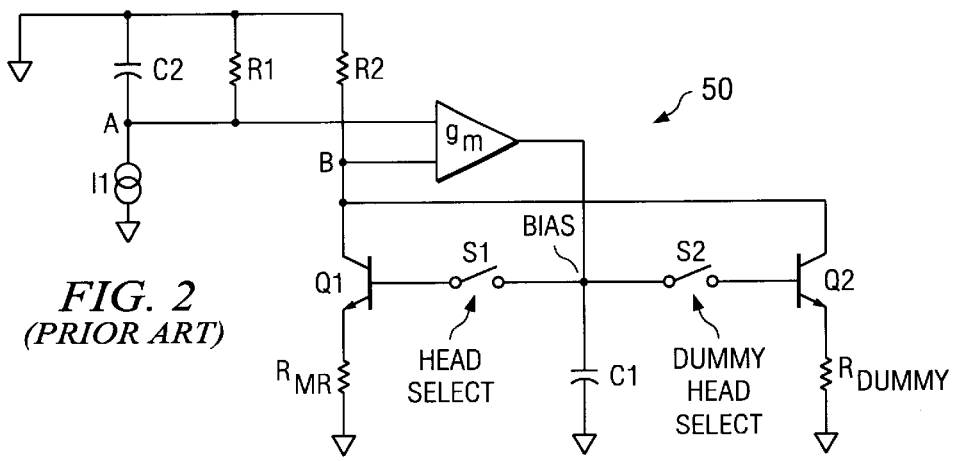
FIG. 2 is a schematic diagram illustrating a prior art bias voltage circuit stage within a preamplifier circuit in a hard disk drive system.
Figure 3:
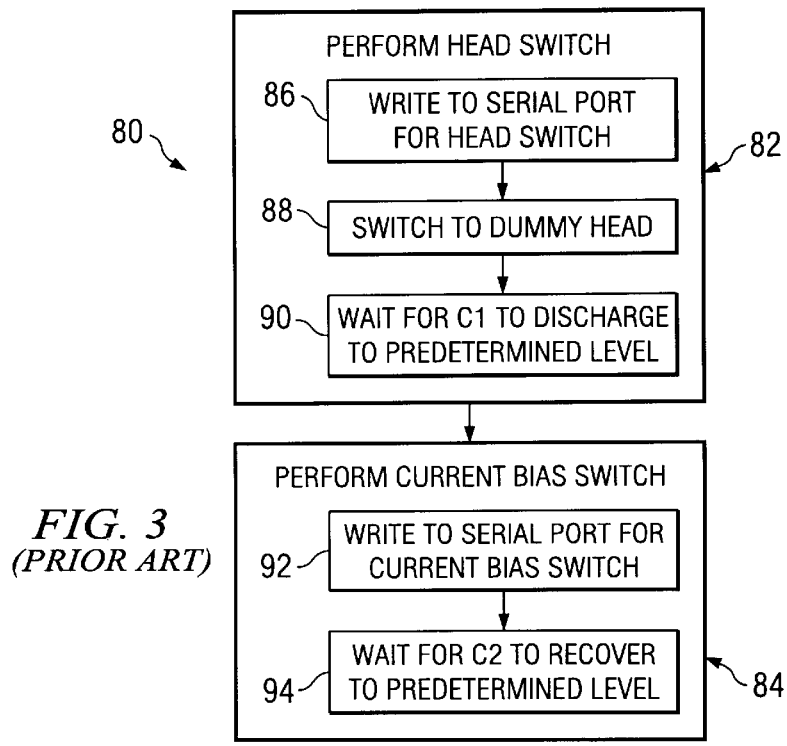
FIG. 3 is a flow chart diagram illustrating a prior art two step method of switching to a new head involving the serial steps of switching the head and performing a current bias switch.
Figure 4:
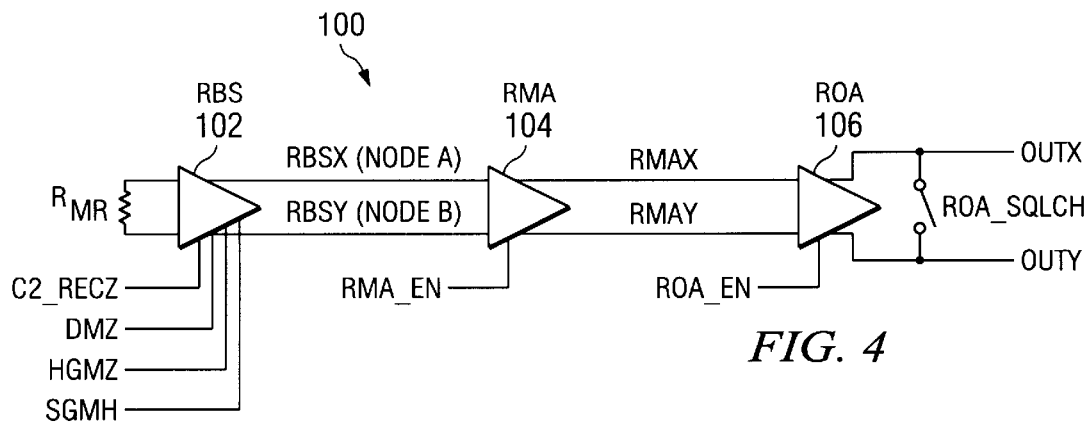
FIG. 4 is a schematic diagram illustrating multiple stages of a preamplifier circuit for a disk drive system according to the present invention.

Turning now to the Figures, FIG. 4 is a schematic diagram illustrating an exemplary preamplifier circuit 100 according to the present invention. The preamplifier circuit 100 includes multiple stages, such as a reader bias voltage stage (RBS) 102 which is coupled to a presently selected head which is represented as a head resistance $R_{MR}$. The preamplifier circuit 100 further includes a reader middle stage amplifier (RMA) 104 and a reader output stage amplifier (ROA) 106. The differential outputs OUTX and OUTY of the output stage 106 have a switch 108 coupled thereacross to allow a squelch signal ROA_SQLCH to be asserted and short out the outputs OUTX and OUTY when a read function is not occurring in order to avoid spurious noise from being coupled to the read channel (not shown) which couples to the outputs of the preamplifier. As can be seen from FIG. 4, the middle stage 104 and the output stage 106 can be selectively activated and deactivated as desired in accordance with enable signals RMA_EN and ROA_EN, respectively.

In accordance with one exemplary aspect of the present invention, a circuit architecture and timing sequence associated with the reader bias voltage stage 102 of the preamplifier circuit is disclosed. The bias voltage stage senses the voltage across the head $R_{MR}$ and is controlled by signals C2_RECZ, DMZ, HGMZ and SGMH which will be described in greater detail below.

Figure 5:
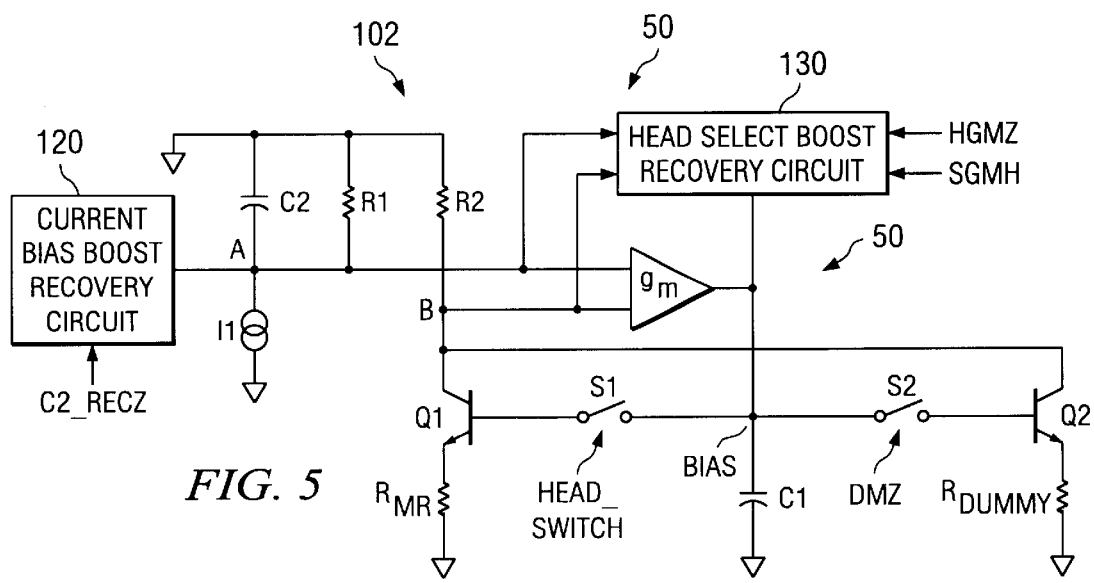
FIG. 5 is a schematic diagram illustrating a bias voltage circuit stage circuit portion of a preamplifier circuit having a current bias boost recovery circuit and a head select boost recovery circuit associated therewith according to the present invention.

FIG. 5 is a schematic diagram illustrating the bias voltage stage 102 in greater detail in accordance with one exemplary aspect of the present invention. The circuit 102 is coupled to a power supply voltage which provides power to a parallel arrangement of a noise reduction capacitor C2 and a reference resistor R1 which are coupled between the supply and a current source I1 through a reference node A. The current source I1 has a magnitude related to the desired bias current and operates to set up a reference voltage at node A using the reference resistor R1. The noise reduction capacitor C2 operates to reduce high frequency noise at node A.

A second resistor R2 is also coupled to the power supply and also to another node B which, as will be explained in greater detail later, has a magnitude which is a function of the bias current magnitude. Nodes A and B serve as the differential outputs of the bias voltage stage (see, e.g., FIG. 4) and also serve as inputs to a differential amplifier $g_m$ which operates to compare nodes A and B and drive an output node BIAS in response thereto. That is, when B is greater than A, the output of $g_m$ is high, which causes a bias capacitor C1 associated with the node BIAS to charge and thus increase in voltage. When a given head is selected, the bias voltage across C1 is coupled to a transistor Q1 via a closed switch S1 which causes Q1 to turn on more strongly by an amount which is related to a magnitude of the bias voltage. The increased current in Q1 causes the voltage at node B to decrease toward the reference voltage at node A. Likewise, when node A is greater than node B, $g_m$ goes low and discharges C1, thereby causing Q1 to conduct less and thus increasing the voltage at node B. In the above manner the bias current for the head is generated through R2 as dictated by the target voltage value at node A.

The bias voltage stage 102 further includes a current bias boost recovery circuit 120. The current bias boost recovery circuit 120 is configured to increase a rate at which the noise reduction capacitor C2 charges to increase a rate at which the noise reduction capacitor C2 recovers. For example, when a read operation is to commence, the bias voltage circuit 102 requires the reference node A to be at or at least near a target voltage value. Because of C2, the rate at which node A transitions to its target value is slow. The current bias boost recovery circuit 120 improves the recovery of C2 by increasing a rate of charging of C2. Any circuit operable to increase the rate of charging of C2 to a target voltage may be employed and any such circuit is contemplated as falling within the scope of the present invention. In accordance with one exemplary aspect of the present invention, the current bias boost recovery circuit 120 is operable to identify the desired target voltage value via, for example, sensing a current magnitude of the current source I1 and generating a voltage associated therewith. Further, the current bias boost recovery circuit 120 is operable to selectively couple the generated voltage directly or substantially directly to the reference node A, thereby increasing a rate of charging of the noise reduction capacitor C2.

The bias voltage circuit 102 further includes a head select boost recovery circuit 130 which is, for example, coupled in parallel with the differential amplifier $g_m$. The head select boost recovery circuit 130 is configured to improve the recovery of the bias capacitor C1 during a head switch by increasing a rate of charging or discharging of C1 during such a switch. For example, when a head switch takes place, HEAD_SWITCH goes low, thereby opening S1 and DMZ (active low) goes low, thus closing S2, and coupling a dummy head $R_{DUMMY}$ to C1. The dummy head is typically a resistance value which is 10–20% of the lowest expected head resistance. Consequently, coupling C1 to the dummy head causes C1 to discharge to a low value so that when C1 is coupled to the next selected head a large value will not exist across C1 and thereby a glitch and head damage associated therewith is avoided.

Because the discharge of C1 to a safe level is important for safe switching to the next selected head, it is desirable to discharge C1 in an expeditious manner. The head select boost recovery circuit 130 of the present invention provides such functionality. The head select boost recovery circuit 130, upon activation, compares the voltages at nodes A and B and based upon the comparison provides additional drive to the BIAS node to increase the charging or discharging of C1. Any circuit which provides such functionality may be employed and is contemplated as falling within the scope of the present invention.

The current bias boost recovery circuit 120 and the head select boost recovery circuit 130 operate in conjunction with one another to allow a head switch and a current bias switch to occur concurrently. Recall that in the prior art, a head switch and a current bias switch could not occur concurrently, because the slow recovery of C2 caused the reference voltage at node A to slowly transition up to its target value. Consequently, the differential amplifier gm would keep switching as node A continued to change in order to adjust the level at node B. However, because node A behaved as a slowly moving target and did not reach its target voltage level for a long time, the rate of discharge of C1 during this time would be exceedingly slow and C1 would not sufficiently discharge by the time the next selected head was switched into the circuit. The lack of sufficient discharge of C1 in the prior art resulted in the node voltage at BIAS to be greater than a desired value; thus if the next selected head had a relatively small resistance associated therewith, the voltage level at the BIAS node could disadvantageously result in a potentially damaging voltage glitch at the newly selected head.

According to the present invention, the current bias boost recovery circuit 120 causes the C2 recovery rate to dramatically increase. That is, the rate at which the reference node A reaches its target voltage value is substantially increased by determining the desired target voltage value and coupling the target voltage value directly or substantially directly to node A, thus causing C2 to charge to the desired target voltage level extremely quickly. Therefore the slow recovery of C2 in prior art architectures is eliminated and C2 no longer impedes the recovery of C1. In addition, the head select boost recovery circuit 130 senses the voltage across nodes A and B and if the difference exceeds a predetermined threshold, the circuit provides additional drive to C1, thus increasing a rate of charge or discharge of C1. Because C2 reaches its target value extremely quickly, the desired bias current is known and the head select boost recovery circuit 130 can operate to quickly charge or discharge C1 based on a comparison of nodes A and B in order to move node B toward node A and establish the desired bias current. Therefore the present invention overcomes the disadvantages associated with the prior art.

Figure 6:
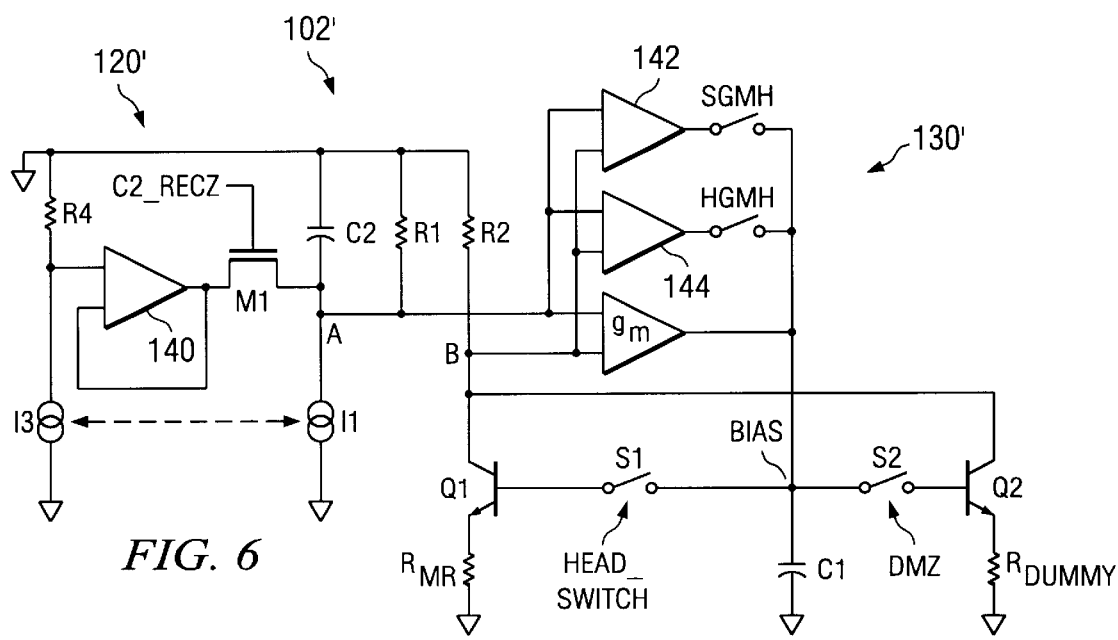
FIG. 6 is a schematic diagram illustrating a bias voltage circuit stage circuit portion of a preamplifier circuit having an exemplary detailed current bias boost recovery circuit and an exemplary detailed head select boost recovery circuit associated therewith according to one exemplary aspect of the present invention.

FIG. 6 illustrates in greater detail a bias voltage circuit architecture 102' in accordance with one exemplary aspect of the present invention. The circuit 102' includes one exemplary implementation of a current bias boost recovery circuit 120' and a head select boost recovery circuit 130', respectively. The current bias boost recovery circuit 120' includes a unity gain amplifier 140 coupled to a transistor switch M1 which has a gate terminal coupled to the control input C2_RECZ. The circuit 120' further includes a resistor R4 and a current source I3 coupled to the amplifier 140.

The current bias boost recovery circuit 120' operates in the following exemplary manner. The current source I3 forms a current mirror circuit in conjunction with the current source I1, thereby generating a current through R4 which is a function of a target voltage at node A. That is, I3 is related to I1 which is setting up the target voltage value through R1. Since I3 is a function of I1, I3 conducting through R4 generates a voltage which is approximately equal or otherwise related to the target voltage value. The current through R4 generates a voltage at the input of the amplifier 140 that is reflected at the amplifier output. The current mirror I3 and the resistor R4 therefore operate collectively as a target voltage value identification circuit.

The generated voltage at the output of the amplifier 140 is then selectively coupled to node A based on whether M1 turns on and couples the generated voltage (which is equal to or at least related to the target voltage) directly to node A, which thereby increases the rate at which C2 charges. Therefore the amplifier 140 and transistor M1 behave as a target voltage value application circuit.

The exemplary head select boost recovery circuit 130' includes a pair of parallel coupled comparators 142 and 144 having inputs which are coupled to nodes A and B and outputs coupled to C1 (the BIAS node) via switches S3 and S4, respectively. According to one exemplary aspect of the present invention, comparator 142 is coupled to C1 via switch S3 when SGMH goes high. Although coupled to C1, the comparator 142 will not activate unless the difference between nodes A and B exceeds a predetermined threshold. That is, the comparator 142 has an offset trigger voltage (or hysteresis) having a value associated with the predetermined threshold. Consequently, A-B or B-A must exceed the predetermined threshold in order for the comparator 142 to become activated and thus drive C1.

When a head switch is initiated, S1 opens and S2 closes to thereby couple the dummy head to C1 and initiate the discharge thereof to a safe level. If the difference between nodes A and B exceeds the predetermined threshold, comparator 142 activates to provide additional drive to $g_m$ in order to drive C1 to a proper level. Note that the comparator 142 may operate to discharge or charge C1 as appropriate. Because the current bias boost recovery circuit 120' now operates to recover C2 to a target voltage level extremely quickly (wherein the target voltage level helps set the desired bias current level for the next selected head), in many cases the comparator 142 will not operate to discharge C1, but rather will help charge C1 quickly to a level that adjusts node B to be within a predetermined threshold amount of node A to set the bias current. In any event, comparator 142 provides additional drive to aid in a fast recovery thereof to a desired voltage level.

For example, if C2_RECZ is activated at the same time the head switch is performed, C2 recovers to its target voltage value quickly, thus node A will likely exceed the voltage value at node B. If A-B exceeds the predetermined threshold, the comparator 142 triggers to provide additional drive current to C1, thereby greatly increasing the rate at which the voltage at node B approaches that of node A. Since the voltage at node B sets the bias current, the faster node B approaches the target value at node A, the faster the bias current is set, thus improving the recovery time.

According to one exemplary aspect of the present invention, the comparator 144 is coupled across the gm amplifier when HGMH goes low and the switch associated therewith closes (thus coupling the comparator to BIAS). Comparator 144 operates to provide additional drive to C1 after the C2 recovery period is complete. Unlike comparator 142, the comparator 144 does not have an offset trigger voltage and thus the comparator will always be activated as long as nodes A and B are not equal. Consequently, comparator 144 will provide drive to C1 even as the nodes A and B get closer together, thereby further aiding in an expeditious recovery of C1.

Figure 7:
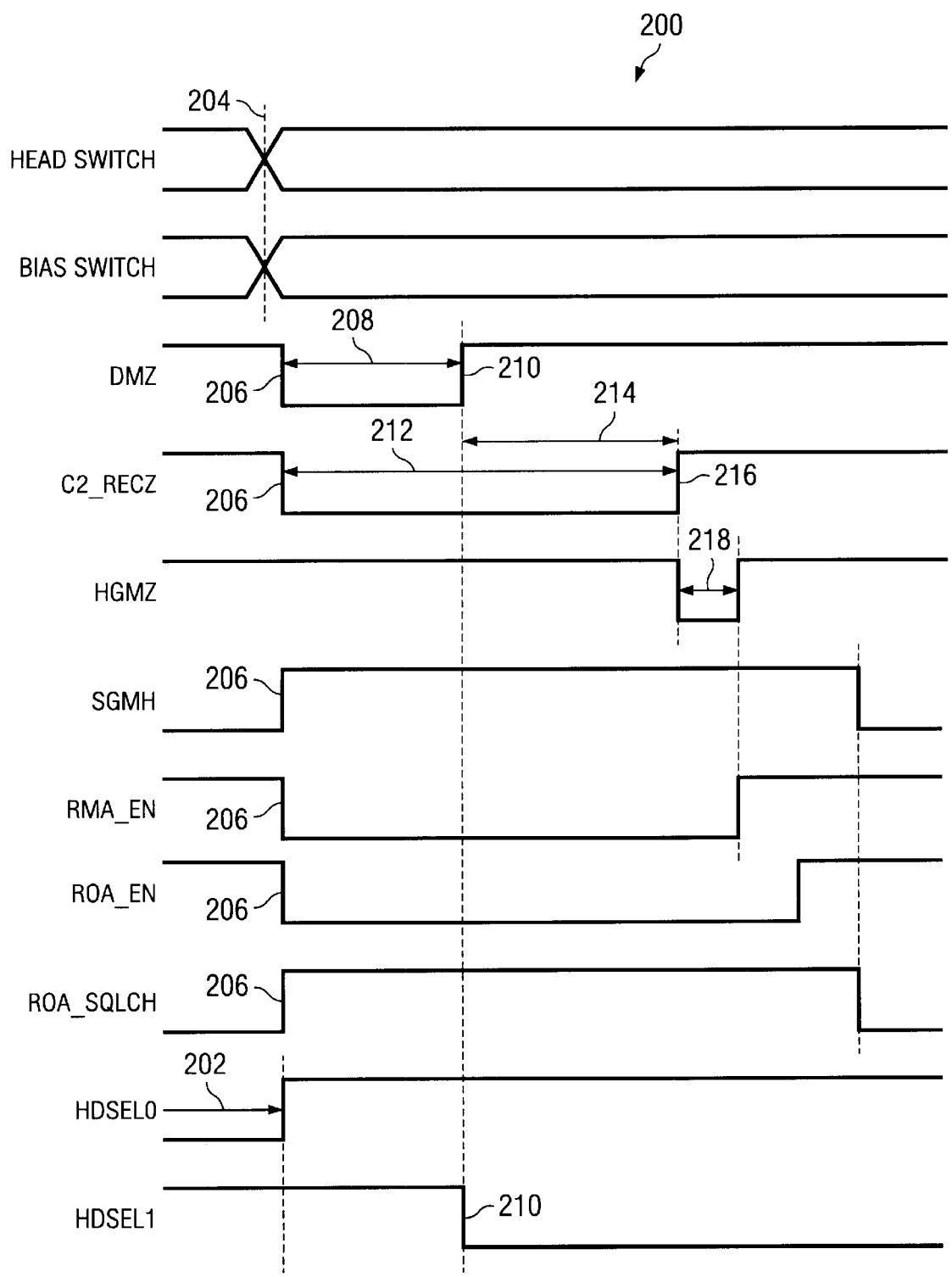
FIG. 7 is a timing diagram illustrating an exemplary timing relationship between various control signals which may be utilized in conjunction with the bias voltage circuit stage of FIGS. 5 or 6 according to the present invention.

Due to the circuit architecture highlighted above, a head switch and a current bias switch may be performed concurrently, as shown in the exemplary timing diagram of FIG. 7 and designated at reference numeral 200. In the example of FIG. 7, a head switch occurs from head0 (present head) to head1 (newly selected head). In time period 202 prior to the switching, HDSEL0 is low and HDSEL1 is high indicating that head0 is the presently selected head and head1 is not selected. At time instant 204 a head switch and bias switch command signal (HEAD_SWITCH and BIAS_SWITCH) occur generally concurrently (concurrent does not require that they be exactly simultaneously).

The HEAD_SWITCH command causes a DMZ signal to go low, thereby initiating a switch to the dummy head at time instant 206 (note HDSEL0 going high at instant 206). For example, HEAD_SWITCH may open switch S1 and DMZ may close switch S2 of FIG. 6 to thereby couple C1 to the dummy head via transistor Q2. HEAD_SWITCH also causes SGMH to go high, thereby activating a head select boost circuit, such as closing switch S3 of FIG. 6 which allows comparator 142 to help drive C1 if necessary. In addition, the change in BIAS_SWITCH causes C2_RECZ to go low at instant 206 which initiates a C2 recovery boost phase, wherein the reference node associated with the noise reduction capacitor C2 is brought to a target voltage value quickly. For example, C2_RECZ may activate M1 of FIG. 6 and couple the bias current boost recovery circuit 120' to the reference node A.

The HEAD_SWITCH command signal also causes RMA_EN and ROA)_EN to go low, thereby deactivating the middle stage and output stage of the preamplifier circuit during the head switch. In addition, ROA_SQLCH goes high, thereby shorting out the preamplifier output and prohibiting spurious noise from being transmitted from the preamplifier to the read channel during the head/bias switch.

As can be seen from the above timing sequence, the head switch and the bias current switch is performed concurrently, for example, by writing a multi-bit code having two portions to the serial port register. For example, the first portion may identify the next desired head while the second portion identifies the desired bias current associated with the next head. Because DMZ and C2_RECZ are both low, the voltage at node A will be driven by the bias current boost recovery circuit 120' and the bias voltage across capacitor C1 will be influenced by the head select boost recovery circuit to cause C1 to recover in an expeditious manner.

During time period 208, DMZ is low and the bias capacitor C1 is charged or discharged quickly based on the state of node A which is recovering due to C2_RECZ going low. Initially, C1 may discharge because $R_{DUMMY}$ is small and node B will be greater than node B, when node A is only beginning to charge. The activation of the dummy head ends at time instant 210 when DMZ goes high, thereby opening switch S2 and perhaps initiating the closing of a switch associated with head1 to couple C1 thereto (see, e.g., HDSEL1 going low). At this instant, the voltage at C1 is sufficiently low to prevent a glitch from occurring at head1. Furthermore the C2 recovery period indicated at reference numeral 212 continues such that the voltage at node A continues to increase toward its target value quickly. During the latter portion of time period 212, indicated by time period 214, the comparator 142 is available to boost C1 and thus increase the rate at which the bias voltage reaches its optimal level, thereby bringing node B approximately to node A and setting the bias current to its proper level for the new head.

At time period 216, C2_RECZ goes high, thereby discontinuing the recovery of C2, for example, by opening switch M1 of FIG. 6. The HGMZ signal then goes low for a time period 218, at which time the comparator 144 gets coupled in parallel with the gm amplifier to provide additional drive to C1 and thereby further expedite the recovery of C1.

As can be seen from the above exemplary circuit architecture and timing sequencing methodology, the present invention provides for a concurrent head switch and bias current switch via a head boost recovery circuit and a bias current boost recovery circuit, respectively.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application. Furthermore, to the extent that the term "includes" is used in either the detailed description and the claims, such term is intended to be inclusive in a manner similar to the term "comprising."

What is claimed is:

1. A preamplifier circuit for a hard disk drive system, comprising:
   a preamplifier circuit having a bias voltage circuit stage associated therewith;
   a current bias boost recovery circuit operatively coupled to the bias voltage circuit stage, wherein the current bias boost recovery circuit is operable to increase a rate of charging of a noise reduction capacitor associated with the bias voltage circuit stage; and
   a head select boost recovery circuit operatively coupled to the bias voltage circuit, wherein the head select boost recovery circuit is operable to increase a rate of charging or discharging of a bias capacitor associated with the bias voltage circuit stage.

2. The preamplifier circuit of claim 1, wherein the current bias boost recovery circuit comprises:
   a voltage level detection circuit operable to determine a target voltage associated with the noise reduction capacitor; and
   a target voltage application circuit operatively coupled to the voltage level detection circuit, and operable to selectively apply a voltage level associated with the target voltage to a node of the noise reduction capacitor, thereby increasing a rate at which the noise reduction capacitor charges to the target voltage.

3. The preamplifier circuit of claim 2, wherein the voltage level detection circuit comprises:
   a current mirror circuit including a current source circuit operable to generate a current which is related to the target voltage; and
   a voltage generation circuit operatively coupled to the current mirror and operable to generate the voltage level using the generated circuit.

4. The preamplifier circuit of claim 3, wherein the voltage generation circuit comprises a resistor.

5. The preamplifier circuit of claim 2, wherein the target voltage application circuit comprises a selectively activatable switch, wherein when activated the switch is closed and couples the generated voltage level to the node of the noise reduction capacitor, and when deactivated the switch is open and decouples the current bias boost recovery circuit from the bias voltage circuit stage of the preamplifier circuit.

6. The preamplifier circuit of claim 1, wherein the head select boost recovery circuit comprises:
   a first differential amplifier circuit operable to compare a first voltage at a first node associated with the noise reduction capacitor and a second voltage at a second node associated with a bias current of a selected head of the disk drive, wherein the first and second nodes form a differential output of the bias voltage circuit stage, and wherein an output of the first differential amplifier circuit drives the bias capacitor based on the comparison, thereby generating a bias voltage thereacross, and wherein the bias voltage is used to bias a selected head at a desired bias current value; and
   a second differential amplifier circuit coupled in parallel with the first differential amplifier circuit, and wherein the second differential amplifier circuit has an offset trip voltage associated therewith, thereby causing an activation thereof when a difference between the first and second voltages exceeds a predetermined threshold, and wherein the second differential amplifier circuit provides additional drive to the first differential amplifier circuit to boost a rate of charging or discharging of the bias capacitor when the differential input voltage is larger than the predetermined threshold.

7. The preamplifier circuit of claim 6, wherein the head select boost recovery circuit is operable to increase a rate at which a head is switched by increasing a rate of discharge in the bias capacitor when the head select boost recovery circuit switches to a dummy load.

8. The preamplifier circuit of claim 1, wherein the head select boost recovery circuit comprises:
   a bias capacitor charge/discharge circuit operable to charge or discharge the bias capacitor to a voltage level based upon a comparison of a voltage associated with a reference voltage and a voltage associated with the bias current; and
   a transconductance circuit operatively coupled to the bias capacitor charge/discharge circuit, and operable to convert the voltage level associated with the bias capacitor to a bias current.

9. The preamplifier circuit of claim 8, wherein the transconductance circuit comprises a transistor having a control terminal coupled to the bias capacitor, and wherein a current conducting therethrough comprises the bias current and is related to the voltage level across the bias capacitor.

10. The preamplifier circuit of claim 8, wherein the bias capacitor charge/discharge circuit comprises:
    a plurality of differential amplifiers coupled together in parallel between the two input nodes and the bias capacitor, wherein one of the input nodes is associated with the reference voltage and the other node is associated with the voltage associated with the bias current,
    wherein a first differential amplifier is operable to charge or discharge the bias capacitor when one node voltage is greater than the other node voltage; and
    wherein a second differential amplifier is operable to charge or discharge the bias capacitor when a difference between the node voltages exceeds a predetermined threshold, thereby providing an increased drive to the bias capacitor to increase a rate of charging or discharging when the difference between the node voltages exceeds the predetermined threshold.

11. A preamplifier circuit, comprising:
    a reference voltage circuit operable to generate a reference voltage at a reference node;
    a noise reduction capacitor coupled across the reference voltage circuit;
    a current bias boost recovery circuit operatively coupled to the reference node, and operable to increase a rate of charging of the noise reduction capacitor;
    a differential amplifier circuit having a first input coupled to the reference node and a second input coupled to a node associated with a bias current, and differential amplifier further having an output coupled to a bias capacitor, and wherein the differential amplifier charges or discharges the bias capacitor based on a differential voltage across the first and second inputs, thereby generating a bias voltage across the bias capacitor;
    a boost circuit coupled in a parallel with the differential amplifier circuit and operable to increase a rate of charging or discharging of the bias capacitor if a difference between the fist and second inputs exceeds a predetermined threshold; and a transconductance circuit coupled to the bias capacitor and operable to generate a bias current having a magnitude which is a function of the bias voltage.

12. A method of performing a head switch and a bias current switch in a single write step to a serial port register, comprising the steps of:

transmitting a multi-bit code to the serial port register associated with a preamplifier circuit, wherein the multi-bit code comprises a first portion which indicates a desired head and a second portion which indicates a desired bias current for the desired head;

asserting a head switch signal and a bias switch signal at about the same time in response to the multi-bit code transmission, wherein the assertion of the head switch signal and the bias switch signal cause the head switch and the bias current switch to proceed concurrently; and activating a current bias boost recovery circuit and a head select boost recovery circuit at about the same time in response to the head switch signal and the bias switch signal, respectively, wherein a recovery associated with a noise reduction capacitor and a bias capacitor is accomplished concurrently.

13. The method of claim 12, wherein the activation of the current bias boost recovery circuit comprises coupling the current bias boost recovery circuit to a portion of the preamplifier circuit, wherein the current bias boost recovery circuit couples a target voltage to a reference node associated with the noise reduction capacitor, thereby increasing a rate of charging of the noise reduction capacitor to the target voltage.

14. The method of claim 12, wherein the activation of the head select boost recovery circuit comprises coupling the head select boost recovery circuit to a portion of the preamplifier circuit, wherein the head select boost recovery circuit increases a rate of charging or discharging of the bias capacitor based on a comparison between a reference node and another node associated with a magnitude of the bias current.

* * * * *